United States Patent
Ito

(10) Patent No.: US 9,923,426 B2
(45) Date of Patent: Mar. 20, 2018

(54) ELECTRIC MOTOR HAVING THREE-LAYER WINDING STRUCTURE

(71) Applicant: FANUC CORPORATION, Yamanashi (JP)

(72) Inventor: Takashi Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 247 days.

(21) Appl. No.: 15/006,247

(22) Filed: Jan. 26, 2016

(65) Prior Publication Data
US 2016/0218580 A1    Jul. 28, 2016

(30) Foreign Application Priority Data
Jan. 28, 2015    (JP) ................... 2015-014591

(51) Int. Cl.
*H02K 3/28*    (2006.01)
(52) U.S. Cl.
CPC ..................... *H02K 3/28* (2013.01)
(58) Field of Classification Search
CPC    H02K 3/12; H02K 3/28; H02K 19/10; H02K 19/103
USPC ................. 310/184, 185, 188, 198
See application file for complete search history.

(56) References Cited

U.S. PATENT DOCUMENTS

| | | | | |
|---|---|---|---|---|
| 4,566,179 A | * | 1/1986 | Sawyer ................ | H02K 1/165 29/596 |
| 5,231,324 A | * | 7/1993 | Kawamura ............ | H02K 3/28 310/184 |
| 2011/0018381 A1 | | 1/2011 | Miyata et al. | |
| 2013/0015742 A1 | * | 1/2013 | Inoue ................. | H02K 3/28 310/208 |

FOREIGN PATENT DOCUMENTS

| DE | 2007495 A1 | 2/1971 |
|---|---|---|
| DE | 2643531 A1 | 4/1977 |
| JP | 59222066 A | 12/1984 |
| JP | 62250851 A | 10/1987 |
| JP | 2151235 A | 6/1990 |
| JP | 9121491 A | 5/1997 |

(Continued)

OTHER PUBLICATIONS

Untranslated Decision to Grant a Patent mailed by Japan Patent Office (JPO) for Application No. JP 2015-014591, dated Oct. 25, 2016, 3 pages.
English machine translation of Decision to Grant a Patent mailed by JPO for Application No. JP 2015-014591, dated Oct. 25, 2016, 3 pages.

(Continued)

*Primary Examiner* — Jeremy Luks
(74) *Attorney, Agent, or Firm* — Fredrikson & Byron, P.A.

(57) ABSTRACT

In a three-phase AC electric motor, in each slot, any or some of the windings of six phases in total, including three phases of U, V, and W phases and opposite phases thereof, are arranged in three layers per slot. As the windings in first layers, of the three-layer windings, U, V, and W-phase windings are arranged so as to have rotational symmetry with one another at a mechanical angle of ±120 degrees. The windings in second layers have the same arrangement as in the first layers shifted by L slots, and the windings in third layers have the same arrangement as in the first layers shifted by L slots in a direction opposite to the arrangement of the windings in the second layers.

3 Claims, 9 Drawing Sheets

(56) References Cited

FOREIGN PATENT DOCUMENTS

JP  200423950 A  1/2004
JP  2004364464 A  12/2004

OTHER PUBLICATIONS

Untranslated Notification of Reasons for Refusal mailed by Japan Patent Office (JPO) for Application No. JP 2015-014591, dated May 31, 2016, 4 pages.
English machine translation of Notification of Reasons for Refusal mailed by Japan Patent Office (JPO) for Application No. JP 2015-014591, dated May 31, 2016, 4 pages.
English Abstract and Machine Translation for Japanese Publication No. 2004-023950 A, published Jan. 22, 2004, 10 pgs.
English Abstract for Japanese Publication No. 62-250851 A, published Oct. 31, 2987, 1 pg.
English Abstract and Machine Translation for Japanese Publication No. 2004-364464 A, published Dec. 24, 2004, 53 pgs.
English Abstract for Japanese Publication No. 09-121491 A, published May 6, 1997, 1 pg.
English Abstract for Japanese Publication No. 02-151235 A, published Jun. 11, 1990, 2 pgs.
English Abstract and Machine Translation for Japanese Publication No. 59-222066 A, published Dec. 13, 1984, 10 pgs.
English Machine Translation for German Publication No. 2643531 A1, published Apr. 7, 1977, 20 pgs.
English Machine Translation for German Publication No. 2007495 A1, published Feb. 25, 1971, 6 pgs.

\* cited by examiner

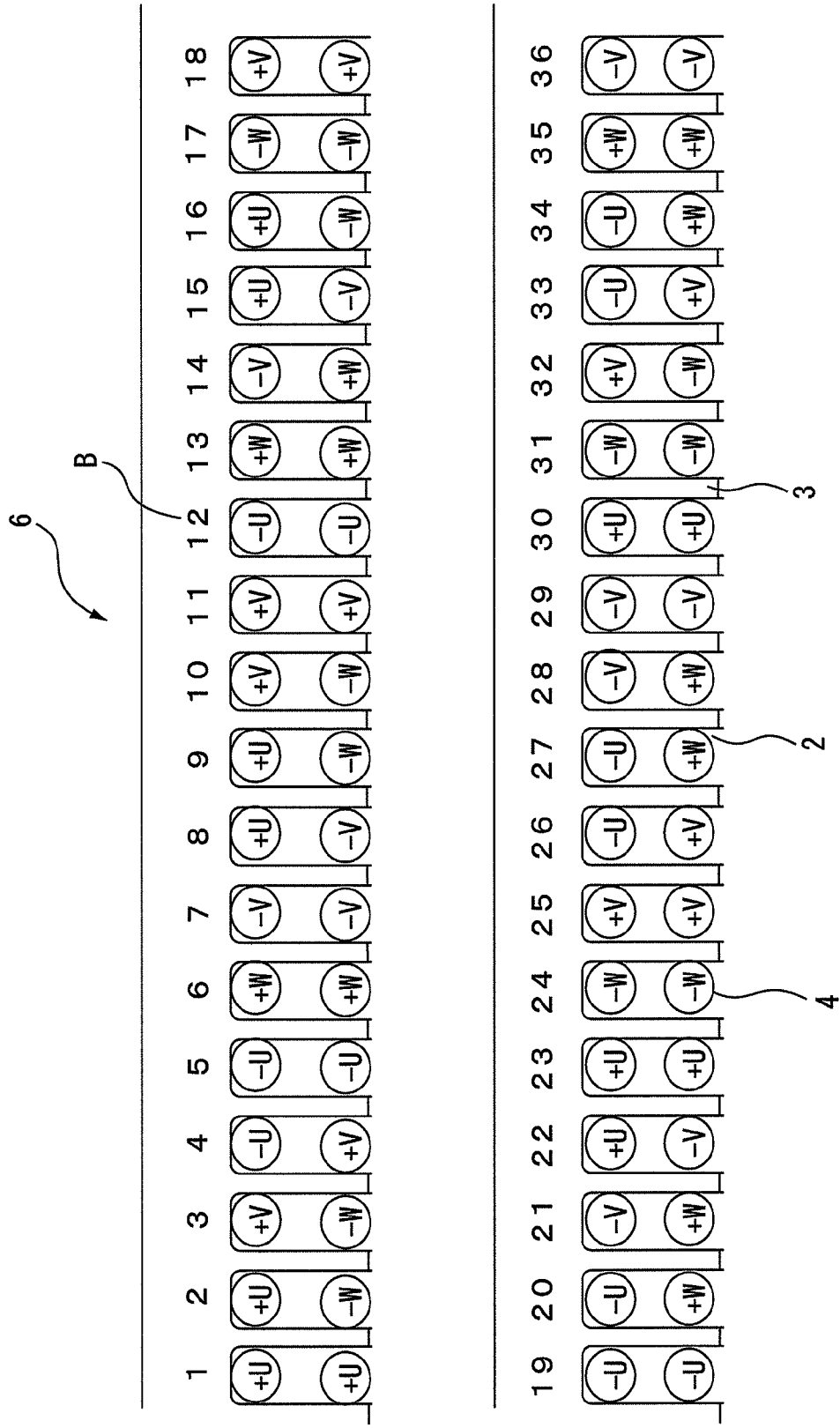

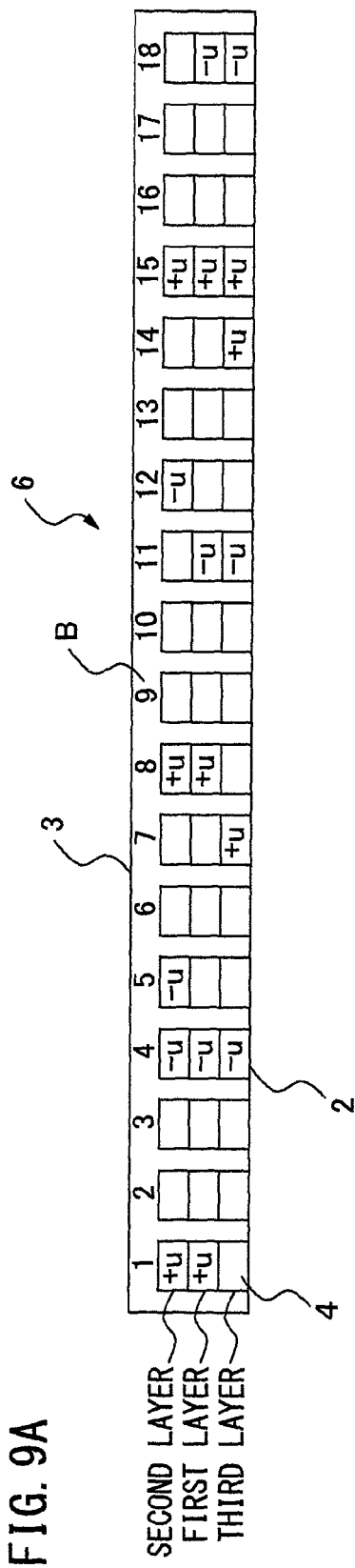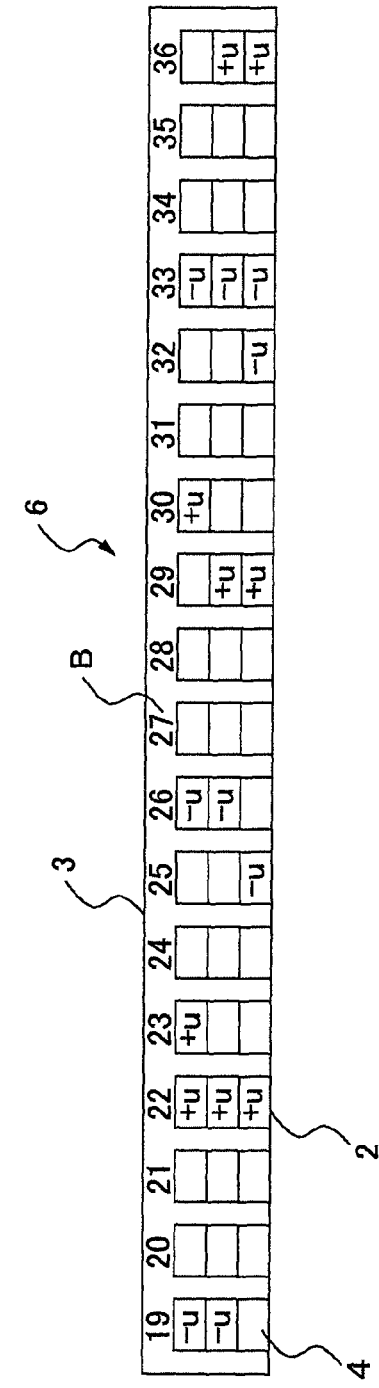
FIG. 9A
FIG. 9B

US 9,923,426 B2

ELECTRIC MOTOR HAVING THREE-LAYER WINDING STRUCTURE

BACKGROUND OF THE INVENTION

1. Field of the Invention

The present invention relates to an electric motor, and more specifically relates to an electric motor having a structure in which three-layer windings are arranged in slots of a stator.

2. Description of Related Art

To reduce torque ripple, optimizations have been conventionally performed on the forms of rotor cores, the forms of stator cores, the skews of the rotor cores, the skews of the stator cores, and the like.

However, such modifications to electric motors require that the electric motors have more complicated structures, causing an increase in the number of process steps in manufacture.

Also, in the electric motors, the magnitude of the torque ripple is affected by the number of poles, the number of slots, and the winding arrangement of windings.

As a combination of the pole number and the slot number that serves to reduce the torque ripple, there is a fractional slot electric motor in which the division of the slot number by the pole number is a fraction in lowest terms (for example, Japanese Patent Application Laid-Open Nos. 2004-23950 and S62-250851).

In the fractional slot electric motor, determining the pole number and the slot number such that the pole number and the slot number have a high least common multiple facilitates reducing the torque ripple. However, of the harmonic components of an induced voltage of the electric motor, harmonic components of relatively low orders do not completely disappear and cause torque ripple.

There is also another problem in that the reduction in the torque ripple brings about a reduction in a winding factor of first order, thus resulting in a reduction in torque.

SUMMARY OF THE INVENTION

An object of the present invention is to provide an electric motor having a winding arrangement that serves to further reduce a torque ripple, while keeping a torque sufficiently high.

A three-phase alternating current electric motor according to an embodiment of the present invention includes a rotor having a plurality of pairs of magnetic poles; a stator that has a plurality of slots formed in the direction of a rotation axis of the rotor and arranged in a circumferential direction and is disposed opposite the rotor in a radial direction; and a plurality of windings inserted into the slots and wound in the stator. When 2P represents the number of the poles of the rotor and N represents the number of the slots of the stator into which the windings are inserted, the division of the slot number N by the number of the pole pairs P is a fraction in lowest terms, and the denominator of the fraction is an odd number. In each of the slots of the stator for inserting the windings thereinto, any or some of the windings of six phases in total, including three phases of a U phase, a V phase, and a W phase and opposite phases thereof, are arranged in three layers per slot. As the windings in the first layers, of the windings in the three layers arranged in the slots, the U-phase windings, the V-phase windings, and the W-phase windings are arranged so as to have rotational symmetry with one another at a mechanical angle of ±120 degrees. The windings in the second layers, which are one of the remaining two layers, have the same arrangement as in the first layers shifted by L slots. The windings in the third layers, which are the other of the remaining two layers, have the same arrangement as in the first layers shifted by L slots in a direction opposite to the arrangement of the windings in the second layers.

BRIEF DESCRIPTION OF THE DRAWINGS

The object, features, and advantages of the present invention will be more apparent from the following description of an embodiment in conjunction with the attached drawings, wherein:

FIG. 2 is a developed sectional view of a two-layer winding arrangement for the ten-pole thirty-six-slot electric motor;

FIGS. 9A and 9B are developed sectional views showing the arrangement of only +U-phase and −U-phase windings in the first to third layers, of the ten-pole thirty-six-slot three-layer winding arrangement for the three-phase alternating current electric motor according to the embodiment of the present invention.

DETAILED DESCRIPTION OF THE INVENTION

Figure 1:
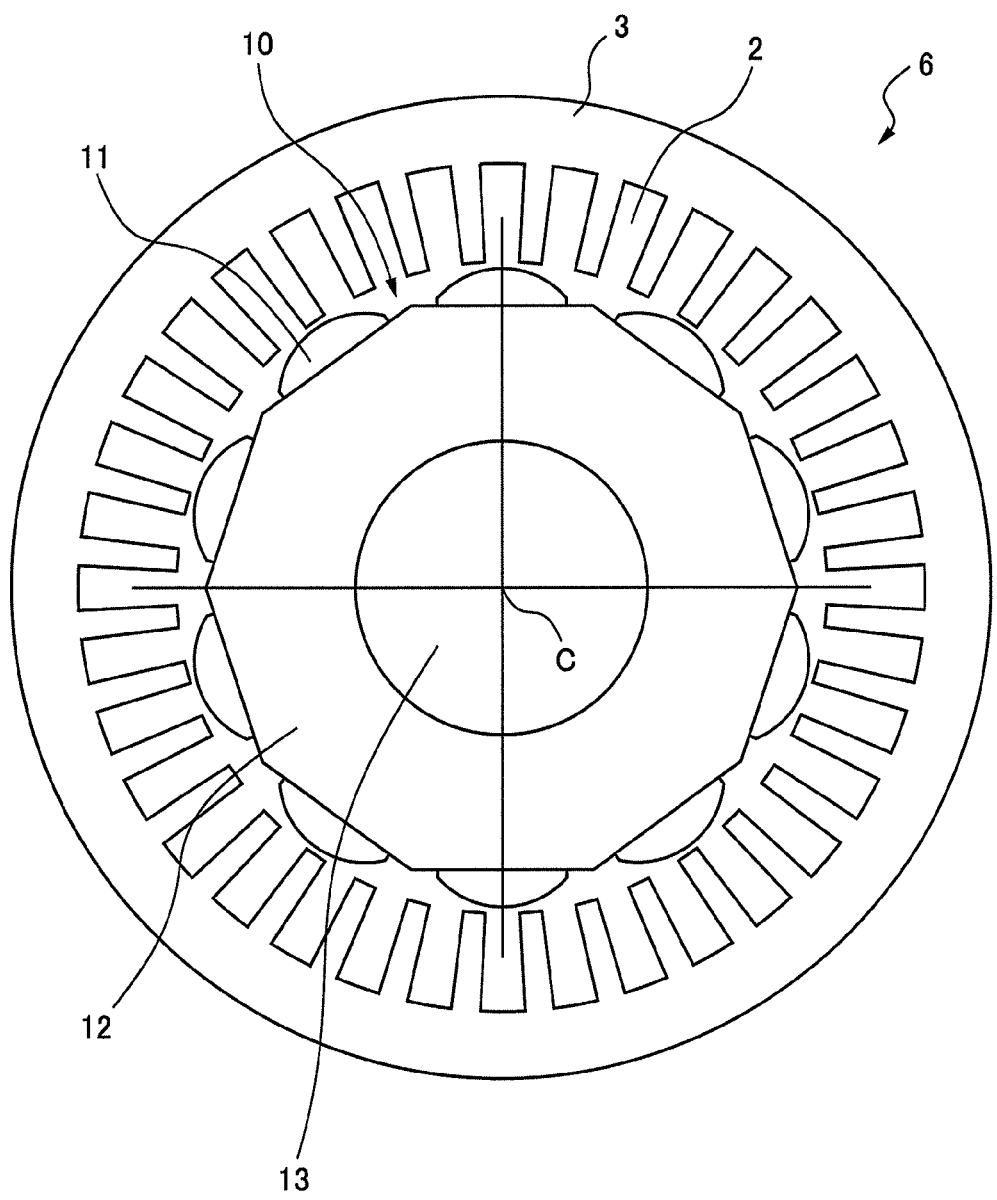
FIG. 1 is a cross sectional view of a ten-pole thirty-six-slot electric motor.

A three-phase alternating current electric motor according to the present invention will be described below with reference to the drawings. FIG. 1 is the sectional view of a ten-pole thirty-six-slot electric motor. In FIG. 1, reference numeral 6 indicates a stator, and reference numeral 10 indicates a rotor. The rotor 10 includes ten magnets 11, a rotor core 12, and a rotor shaft 13. The rotor 10 rotates about a rotation axis C of the rotor. The number of magnetic poles is ten, which is the same number as the magnets. The stator 6 includes a stator core 3, thirty-six slots 2 formed in the direction of the rotation axis C and arranged in a circumferential direction of the rotor, and windings disposed in each slot 2, as described later. Since the present invention relates to the arrangement of the windings wound in the stator core 3 of the electric motor, the description of the rotor will be omitted below. FIG. 2 is the developed sectional view of a two-layer winding arrangement for the ten-pole thirty-six-slot electric motor, in which the number of the poles is ten, the number of the slots is thirty-six, and the two-layer windings are disposed in each slot. In FIG. 2, reference numeral 2 indicates the slots, reference numeral 3 indicates the stator core, reference numeral 4 indicates windings, reference numeral 6 indicates the stator, and symbol B indicates slot identification numbers. The stator 6 is cylindrical in shape, but for the sake of explanation, the stator 6 is illustrated in the developed sectional view in which the cylindrical stator 6 is developed in a linear manner. As shown in FIG. 2, the present invention relates to the winding arrangement of the electric motor having such a relationship that, when 2P represents the number of the poles of the rotor of the electric motor, and N represents the number of the slots of the stator into which the windings are inserted, the division of the slot number N by the number of pole pairs P is a fraction in lowest terms, and the denominator of the fraction is an odd number.

In FIG. 2, "U", "V", and "W" represent the phases of a three-phase alternating current, and "+" and "−" represent the directions of the current. FIG. 2 shows an example of the two-layer winding arrangement, in which any or some of six phases in total, i.e., +U, −U, +V, −V, +W, and −W phases are disposed two by two in each slot. The same number of wires e.g. copper wires are inserted in each disposition to pass the current therethrough.

Hereinafter, "winding" refers to a wire such as a copper wire or a bundle of wires for passing the current therethrough. "Coil" refers to a joined and stacked bundle of closed annular wires that are uniform in shape.

Conventional electric motors have one-layer winding arrangements or two-layer winding arrangements, as shown in FIG. 2. This invention relates to a fractional slot electric motor (electric motor in which the division of a slot number of a stator by the number of pole pairs of a rotor becomes a fraction in lowest terms) having a three-layer winding arrangement.

Figure 3A:
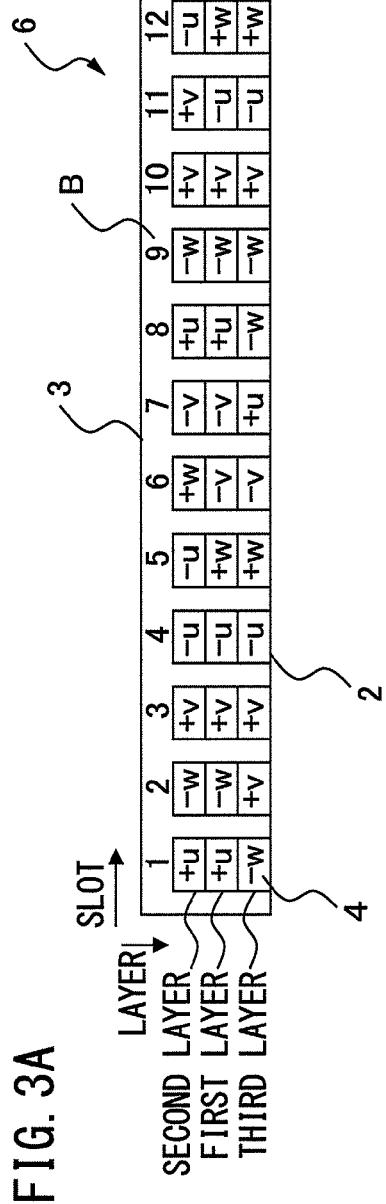
FIGS. 3A and 3B are developed sectional views of a ten-pole thirty-six-slot three-layer winding arrangement for a three-phase alternating current electric motor according to the embodiment of the present invention.
Figure 3B:
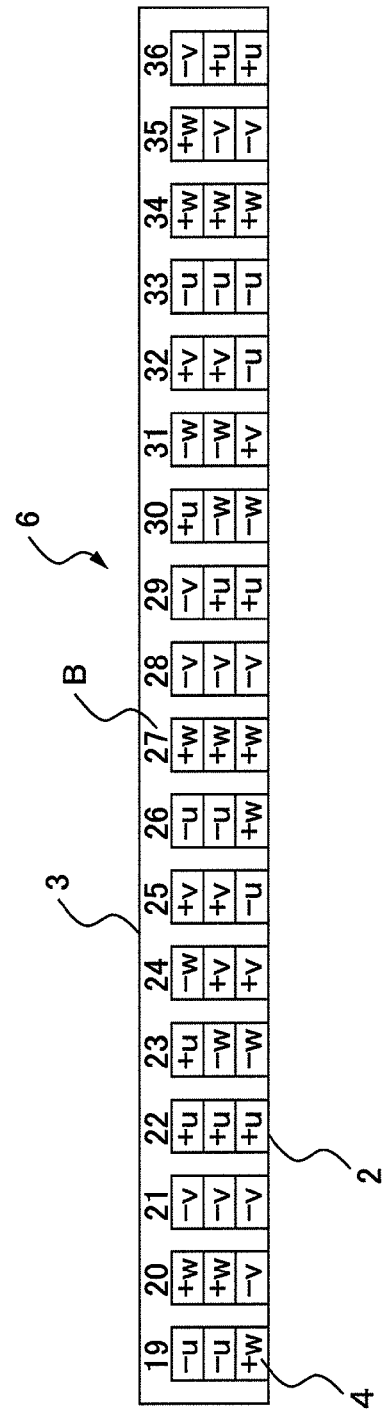

A winding arrangement of a stator in the three-phase alternating current electric motor according to an embodiment of the present invention will be described. A winding arrangement (ten-pole thirty-six-slot three-layer winding arrangement) is taken as an example in which the number of poles of a rotor is ten, the number of slots is thirty-six, and the number of winding layers per slot is three. In other words, the number of pole pairs P=5, and the slot number N=36. FIGS. 3A and 3B are the developed sectional views of the ten-pole thirty-six-slot three-layer winding arrangement in the three-phase alternating current electric motor according to the embodiment of the present invention. FIG. 3A is the developed sectional view of the arrangement of six-phase windings in first to third layers into the slots of the slot identification numbers 1 to 18. FIG. 3B is the developed sectional view of the arrangement of the six-phase windings in the first to third layers into the slots of the slot identification numbers 19 to 36. To identify the layers in the slots in the drawings, as shown in FIG. 3A, "first layer" refers to a middle layer, "second layer" refers to an upper layer over the middle layer, and "third layer" refers to a lower layer under the middle layer.

As shown in FIGS. 3A and 3B, the three-phase alternating current electric motor according to the embodiment of the present invention is constituted of a rotor (see FIG. 1) having a plurality of pairs of magnetic poles, a plurality of slots 2 formed in the direction of a rotation axis of the rotor and arranged in a circumferential direction, a stator 6 disposed opposite the rotor in a radial direction, and a plurality of windings 4 that are inserted into the slots and wound in the stator.

As shown in FIGS. 3A and 3B, in each slot 2 of the stator 6 for inserting the windings 4 therein, any or some of the windings 4 of six phases in total, which include three phases of a U phase, a V phase, and a W phase and opposite phases thereof, are disposed in three layers per slot.

In the fractional slot electric motor, the three-layer winding arrangement facilitates a reduction in winding factors of high orders. Although there are a lot of three-layer winding arrangements conceivable as long as the U-phase windings, the V-phase windings, and the W-phase windings have rotational symmetry with one another at ±120 degrees, choosing a specific arrangement allows an increase in the winding factor of first order. In other words, it is possible to reduce a torque ripple, while keeping a high torque of the electric motor.

In the three-phase alternating current electric motor according to the embodiment of the present invention, the windings of each phase are arranged in three layers in each slot such that the U-phase windings, the V-phase windings, and the W-phase windings have rotational symmetry with one another at a mechanical angle of ±120 degrees.

Since the U-phase windings, the V-phase windings, and the W-phase windings have rotational symmetry with one another at ±120 degrees, the arrangement of the V-phase windings necessarily coincides with the arrangement of the U-phase windings, shown in FIGS. 3A and 3B, shifted to the left by twelve slots, and the arrangement of the W-phase windings necessarily coincides with the arrangement of the U-phase windings shifted to the right by twelve slots. For example, in the first layer, the "+U"-phase winding is assigned to the slot of the slot identification number 1. Shifting the slot to the left by twelve slots, the "+V"-phase winding is assigned to the slot of the slot identification number 25. Shifting the slot to the right by twelve slots, the "+W"-phase winding is assigned to the slot of the slot identification number 13. In a like manner, since the +U-phase windings are arranged in the slots of the slot identification numbers 8, 15, 22, 29, and 36, the +V-phase windings are arranged in the slots of the slot identification numbers 32, 3, 10, 17, and 24 to which the slots of the +U-phase windings are shifted to the left by twelve slots, and the +W-phase windings are arranged in the slots of the slot identification numbers 20, 27, 34, 5, and 12 to which the slots of the +U-phase windings are shifted to the right by twelve slots. The same goes for among the −U-phase, the −V-phase, and the −W-phase. The above description takes the first layer as an example, but the second and third layers have the same relationship.

Next, in the ten-pole thirty-six-slot three-layer winding arrangement of the three-layer alternating current electric motor according to the embodiment of the present invention, a relationship of the winding arrangement among the first, second, and third layers will be described. For the sake of ease of understanding, only one layer of the U-phase (+U-phase and −U-phase) windings will be illustrated below.

Figure 4:
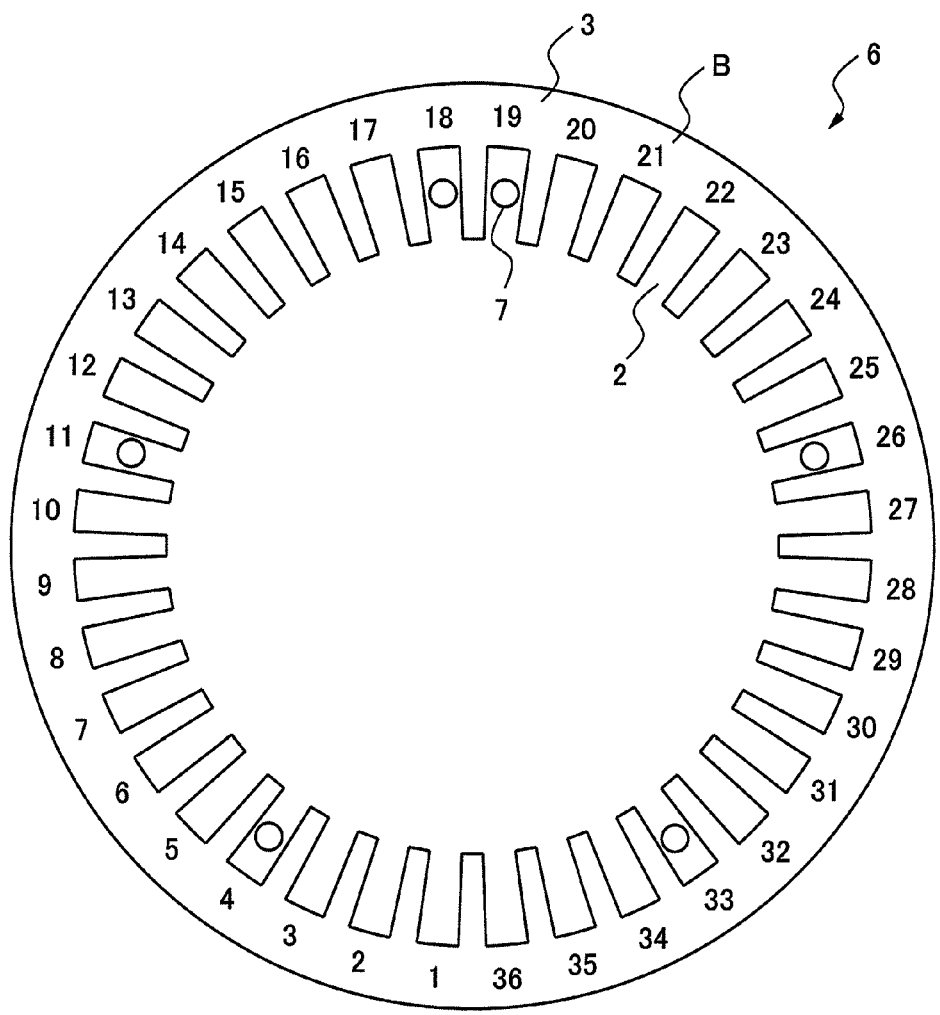
FIG. 4 is a drawing of the arrangement of −U-phase windings in first layers, of the ten-pole thirty-six-slot three-layer winding arrangement for the three-phase alternating current electric motor according to the embodiment of the present invention.

First, the winding arrangement of the first layer will be described. FIG. 4 is the drawing of the arrangement of the −U-phase windings in first layers, of the ten-pole thirty-sixslot three-layer winding arrangement for the three-phase alternating current electric motor according to the embodiment of the present invention. In FIG. 4, white circles indicate −U-phase windings 7 in the first layers. FIG. 4 illustrates only the −U-phase windings, for the sake of ease of understanding. In an example shown in FIG. 4, the −U-phase windings 7 are assigned to the slots of the slot identification numbers 4, 11, 18, 19, 26, and 33.

Figure 5A:
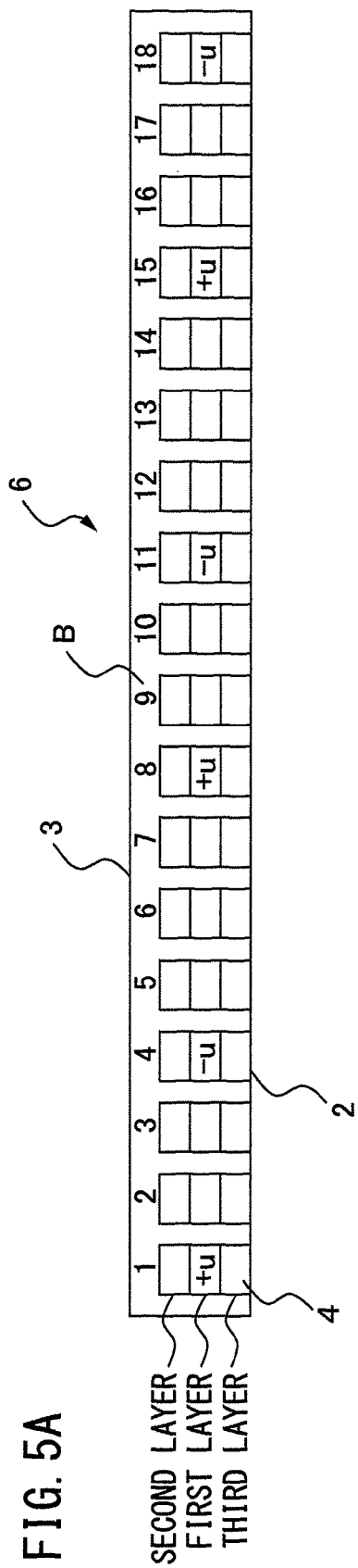
FIGS. 5A and 5B are developed sectional views showing the arrangement of +U-phase and −U-phase windings in the first layers, of the ten-pole thirty-six-slot three-layer winding arrangement for the three-phase alternating current electric motor according to the embodiment of the present invention.
Figure 5B:
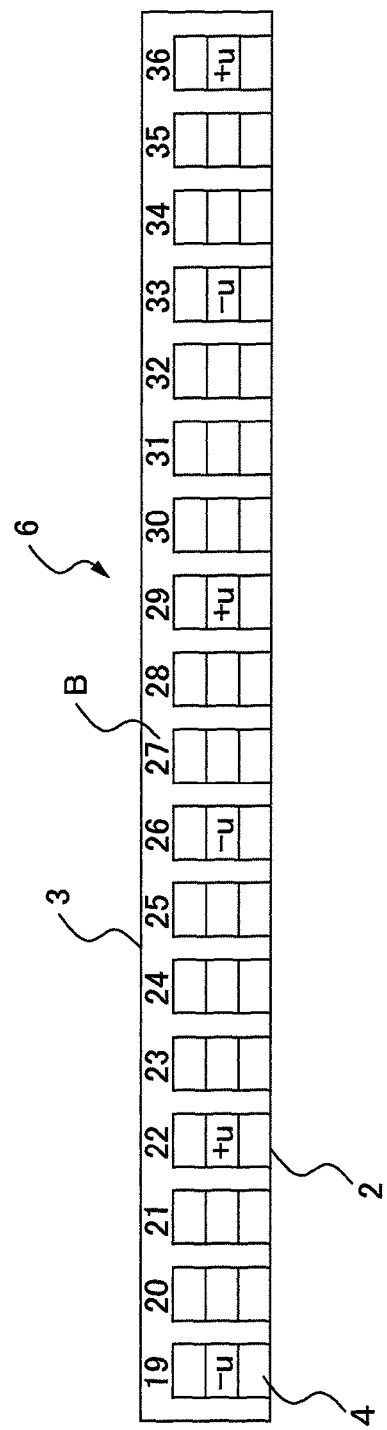

FIGS. 5A and 5B are the developed sectional views showing the arrangement of the +U-phase and −U-phase windings in the first layers, of the ten-pole thirty-six-slot three-layer winding arrangement for the three-phase alternating current electric motor according to the embodiment of the present invention. FIG. 5A is the developed sectional view showing the arrangement of the +U-phase and −U-phase windings in the first layers in the slots of the slot identification numbers 1 to 18. FIG. 5B is the developed sectional view showing the arrangement of the +U-phase and −U-phase windings in the first layers in the slots of the slot identification numbers 19 to 36. The arrangement of the +U-phase windings coincides with the arrangement of the −U-phase windings shifted by eighteen slots. In the example shown in FIGS. 5A and 5B, the +U-phase windings are arranged in the slots of the slot identification numbers 22, 29, 36, 1, 8, and 15, which correspond to the slots of the slot identification numbers 4, 11, 18, 19, 26, and 33, respectively, having the −U-phase windings.

The arrangement in the first layers is arbitrarily changeable as long as the U-phase windings, the V-phase windings, and the W-phase windings have rotational symmetry with one another at ±120 degrees. If the denominator of a fraction in lowest terms of the division of the slot number by the pole number is an odd number, a one-layer winding is necessarily present in which any one of the U phase, the V phase, and the W phase occupies the entire slot.

Figure 6:
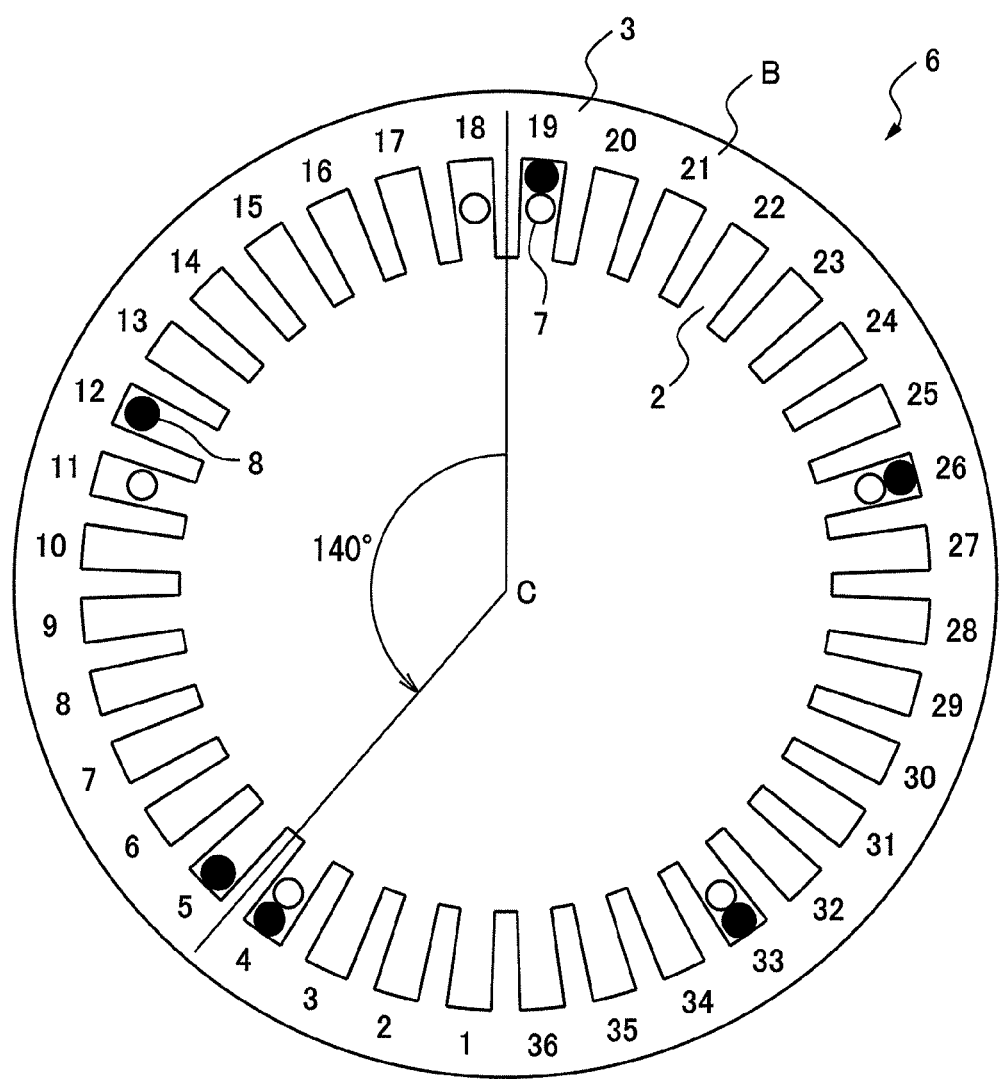
FIG. 6 is a drawing of the arrangement of −U-phase windings in first and second layers, of the ten-pole thirty-six-slot three-layer winding arrangement for the three-phase alternating current electric motor according to the embodiment of the present invention.

Next, a winding arrangement in the second layers will be described. FIG. 6 is the drawing of the arrangement of the −U-phase windings in the first and second layers, of the ten-pole thirty-six-slot three-layer winding arrangement for the three-phase alternating current electric motor according to the embodiment of the present invention. In FIG. 6, black circles indicate −U-phase windings 8 in the second layers.

The −U-phase windings 8 in the second layers, each of which is one of the remaining two layers excepting the first layer from the three layers, are arranged in such positions that the arrangement of the −U-phase windings 7 in the first layers is shifted by L slots. In other words, when the arrangement of the second layers is overlaid on the arrangement of the first layers, the arrangement of the second layers coincides with the arrangement of the first layers shifted to the left by a shift number L=14 slots (140 degrees counterclockwise about the rotation axis C of the stator). For example, in an example shown in FIG. 6, the −U-phase windings of the second layers are arranged in the slots of the slot identification numbers 26, 33, 4, 5, 8, and 19, to which the slots of the slot identification numbers 4, 11, 18, 19, 26, and 33 having the −U-phase windings of the first layers are shifted counterclockwise by fourteen slots.

Figure 7A:
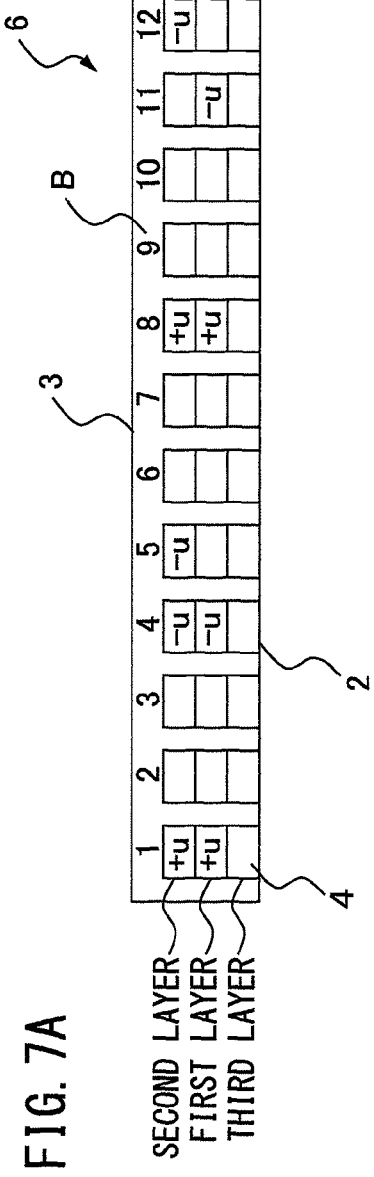
FIGS. 7A and 7B are developed sectional views showing the arrangement of +U-phase and −U-phase windings in the first and second layers, of the ten-pole thirty-six-slot three-layer winding arrangement for the three-phase alternating current electric motor according to the embodiment of the present invention.
Figure 7B:
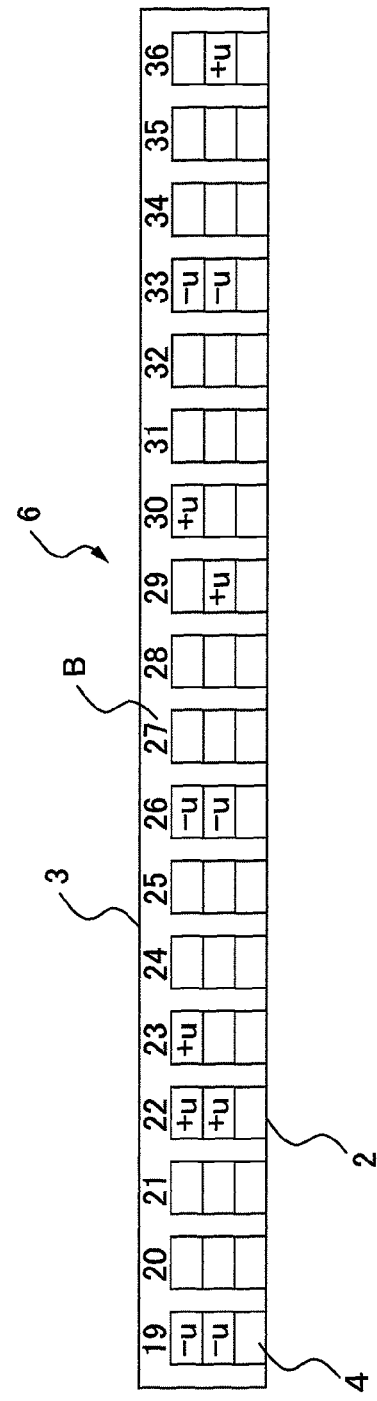

FIGS. 7A and 7B are developed sectional views showing the arrangement of the +U-phase and −U-phase windings in the first and second layers, of the ten-pole thirty-six-slot three-layer winding arrangement for the three-phase alternating current electric motor according to the embodiment of the present invention. FIG. 7A is the developed sectional view showing the arrangement of the +U-phase and −U-phase windings in the first and second layers in the slots of the slot identification numbers 1 to 18. FIG. 7B is the developed sectional view showing the arrangement of the +U-phase and −U-phase windings in the first and second layers in the slots of the slot identification numbers 19 to 36. As shown in FIGS. 7A and 7B, when overlaying the arrangement of the second layers on the arrangement of the first layers, the arrangement of the second layers coincides with the arrangement of the first layers shifted to the left by fourteen slots.

Figure 8:
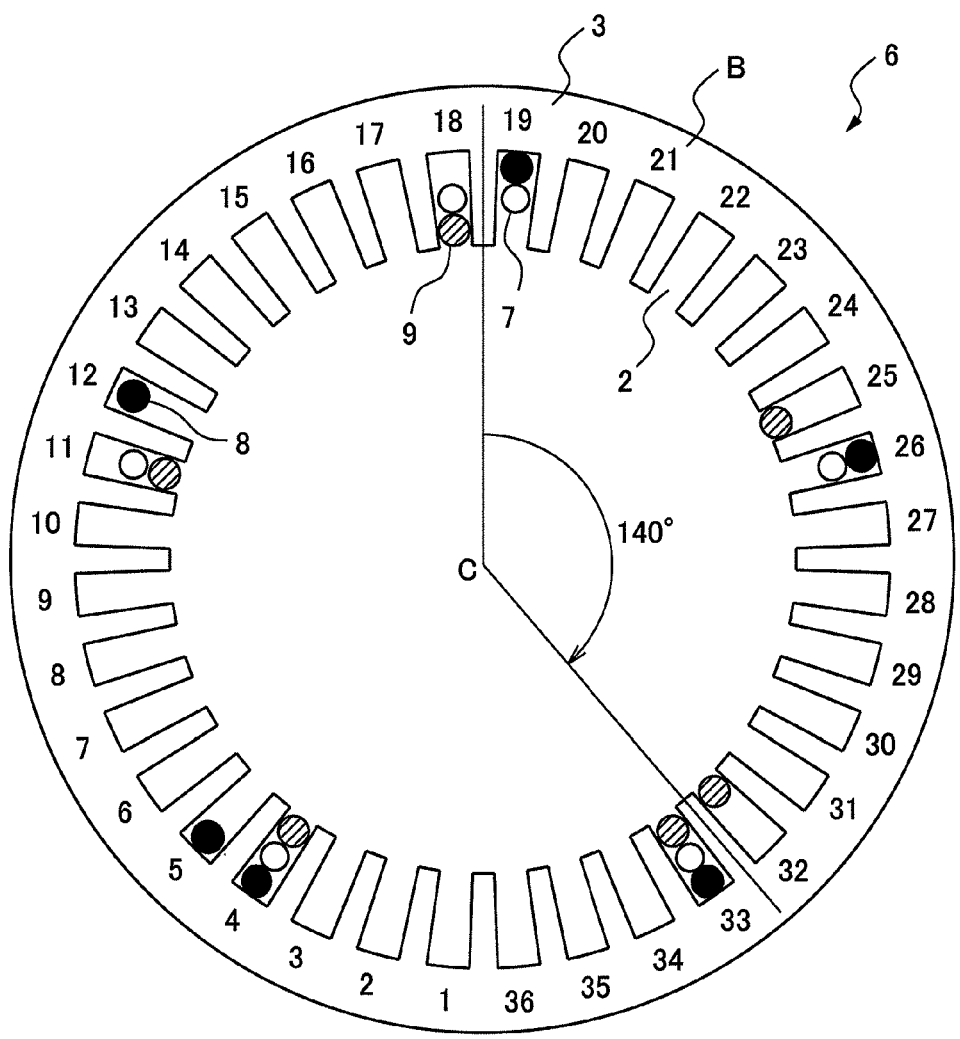
FIG. 8 is a drawing of the arrangement of −U-phase windings in first to third layers, of the ten-pole thirty-six-slot three-layer winding arrangement for the three-phase alternating current electric motor according to the embodiment of the present invention.

Next, the winding arrangement of the third layers will be described. FIG. 8 is the drawing of the arrangement of the −U-phase windings in the first to third layers, of the ten-pole thirty-six-slot three-layer winding arrangement for the three-phase alternating current electric motor according to the embodiment of the present invention. In FIG. 8, the arrangement of the third layers is added to the winding arrangement of FIG. 6. In FIG. 8, cross-hatched circles indicate −U-phase windings 9 in the third layers.

In the three-phase alternating current electric motor according to the embodiment of the present invention, the windings 9 of the third layers, each of which is the other of the remaining two layers, are arranged in such positions that the arrangement of the windings 7 of the first layers having the rotational symmetry is shifted by L slots in a direction opposite to the arrangement of the windings 8 of the second layers. For example, as shown in FIG. 8, the windings of the third layers are disposed in such positions that the arrangement of the first layers is shifted to the right, which is opposite to the arrangement of the second layers, by fourteen slots (140 degrees). For example, in the example shown in FIG. 8, the −U-phase windings of the third layers are disposed in the slots of the slot identification numbers 18, 25, 32, 33, 4, and 11, to which the slots of the slot identification numbers 4, 11, 18, 19, 26, and 33 having the −U-phase windings of the first layers are shifted clockwise by fourteen slots.

FIGS. 9A and 9B are the developed sectional views showing the arrangement of only the +U-phase and −U-phase windings in the first to the third layers, of the ten-pole thirty-six-slot three-layer winding arrangement of the three-phase alternating current electric motor according to the embodiment of the present invention. FIG. 9A is the developed sectional view showing the +U-phase and −U-phase winding arrangement in the first to third layers in the slots of the slot identification numbers 1 to 18. FIG. 9B is the developed sectional view showing the +U-phase and −U-phase winding arrangement in the first to third layers in the slots of the slot identification numbers 19 to 36.

In the slots 2 of the stator of the electric motor, the order of insertion of the three-phase, i.e., U-phase, V-phase, and W-phase windings and the positions of the U-phase, V-phase, and W-phase windings in the slots are not differentiated among the first layers, the second layers, and the third layers.

The arrangement having the shift number L=14 is described in FIG. 8, by way of example, but the value of L is arbitrarily changeable. However, by choosing L in such a manner that an arrangement of "+" or "−" of single-phase windings approximates to the form of a regular polygon with the number of vertexes of which is equal to the number of pole pairs of the electric motor, the winding factor of first order increases, as described later, thus creating a high torque. Since the number of pole pairs of the ten-pole thirty-six-slot motor is 5, the case of L=7, 8, 14 and 15 hold true. If another value is chosen as L, the arrangement takes a form differing from a regular pentagon, and the high torque cannot be obtained.

The values of the winding factors were compared among a ten-pole twelve-slot two-layer winding arrangement, which is a combination of the pole number and the slot number in general electric motors, a conventional ten-pole thirty-six-slot two-layer winding arrangement (having a shift number of 3), and ten-pole thirty-six-slot three-layer winding arrangements (L=1, 7, 8, 14 and 15) according to the present invention. Table 1 shows calculation results of the winding factors in each arrangement. Table 1 does not show the winding factors when L takes a value other than the above, because the winding factor of first order is low.

| Numbers of poles, slots, and layers, and shift number | Order of winding factor | | | | | | |
|---|---|---|---|---|---|---|---|
| | 1st order | 3rd order | 5th order | 7th order | 9th order | 11th order | 13th order |
| 10-pole 12-slot 2-layer windings | 0.933 | 0.5 | 0.067 | 0.067 | 0.5 | 0.933 | 0.933 |
| 10-pole 36-slot 2-layer windings | 0.924 | 0.455 | 0.051 | 0.038 | 0.167 | 0.098 | 0.089 |
| 10-pole 36-slot 3-layer windings (L = 1) | 0.728 | 0.157 | 0.021 | 0.144 | 0.079 | 0.033 | 0.052 |
| 10-pole 36-slot 3-layer windings (L = 7) | 0.947 | 0.586 | 0.15 | 0.082 | 0.079 | 0.011 | 0.009 |
| 10-pole 36-slot 3-layer windings (L = 8) | 0.807 | 0 | 0.058 | 0.065 | 0.236 | 0.046 | 0.027 |
| 10-pole 36-slot 3-layer windings (L = 14) | 0.918 | 0.429 | 0.043 | 0.026 | 0.079 | 0.018 | 0.02 |
| 10-pole 36-slot 3-layer windings (L = 15) | 0.871 | 0.215 | 0.048 | 0.036 | 0.079 | 0.093 | 0.084 |

The winding factor of each order takes a value from 0 to 1. The winding factor of first order has an effect on the magnitude of torque, while the other winding factors of higher orders have effects on the magnitude of torque ripple.

According to Table 1, in the ten-pole thirty-six-slot three-layer winding arrangement, when L=7 or 14, the winding factor of first order is 0.9 or more. When L=7, although the winding factor of first order is high, the winding factors of higher orders are also high as compared with the conventional ten-pole thirty-six-slot two-layer winding arrangement, and thus trailing the conventional arrangement in terms of a reduction in the torque ripple. When L=14, the winding factor of first order is similar in value between the conventional example and the present invention. However, all of the winding factors of higher orders are lower than those of the conventional example. For this reason, the shift amount L is preferably 7, 8, 14, or 15, and more preferably 7 or 14, and most preferably 14.

The winding factors are calculated by the following expression:

$$\frac{|N_1\cos(n\theta_1) + N_2\cos(n\theta_2) + \ldots N_m\cos(n\theta_m)|}{N_1 + N_2 + \ldots + N_m}$$

Here, "n" represents the order of the winding factor, "$N_k$" represents the number of windings in the k-th slot, and "$\theta_k$" represents a slot angle (electrical angle) of the k-th slot with respect to a reference axis. The calculation of the winding factors is sufficient as long as the calculation is performed for one of the six-phase winding arrangements, i.e., the three-phase winding arrangements each including "−" and "+" directions. For example, only the −U-phase winding arrangement is used for the calculation. As the reference axis, in FIG. 8, a line that passes through a midpoint between the slots of the slot identification numbers 18 and 19 and the center of the stator is used in the case of the ten-pole thirty-six-slot electric motor.

As described above, according to the three-phase alternating current electric motor according to the embodiment of the present invention, it is possible to obtain an electric motor having a winding arrangement that brings about a further reduced torque ripple while maintaining a sufficiently high torque of the electric motor.

What is claimed is:

1. A three-phase alternating current electric motor comprising:
   a rotor having a plurality of pairs of magnetic poles;
   a stator having a plurality of slots formed in the direction of a rotation axis of the rotor and arranged in a circumferential direction, the stator is disposed opposite the rotor in a radial direction; and
   a plurality of windings inserted into the slots and wound in the stator, wherein
   when 2P represents the number of poles of the rotor and N represents the number of the slots of the stator into which the windings are inserted, a division of the slot number N by the number of pole pairs P becomes a fraction in lowest terms, and the denominator of the fraction becomes an odd number,
   in each of the slots of the stator for inserting the windings thereinto, any or some of the windings of six phases in total, including three phases of a U phase, a V phase, and a W phase and opposite phases thereof, are disposed in three layers per slot,
   as the windings in first layers, of the windings in the three layers disposed in each slot, U-phase windings, V-phase windings, and W-phase windings are laid out so as to have rotational symmetry with one another at a mechanical angle of ±120 degrees,
   the windings in second layers, each of which is one of the remaining two layers, have the same arrangement as in the first layers shifted by L slots, and
   the windings in third layers, each of which is the other of the remaining two layers, have the same arrangement as in the first layers shifted by L slots in a direction opposite to the arrangement of the windings in the second layers.

2. The three-phase alternating current electric motor according to claim 1, wherein in the slots of the stator of the electric motor, the order of insertion of the three-phase windings, including the U-phase windings, the V-phase windings, and the W-phase windings, and the positions of the U-phase windings, the V-phase windings, and the W-phase windings in the slots are not differentiated among the first layers, the second layers, and the third layers.

3. The three-phase alternating current electric motor according to claim 2, wherein the number of pole pairs P=5, the number of slots N=36, and the number of slots shifted L=14.

* * * * *